(12) United States Patent
Mirle (10) Patent No.: US 8,326,470 B2
(45) Date of Patent: Dec. 4, 2012

(54) REMOTE TRIGGER OF AN ALTERNATE ENERGY SOURCE TO POWER A VEHICLE SYSTEM

(75) Inventor: Sanjeev C. Mirle, Troy, MI (US)

(73) Assignee: General Motors LLC, Detroit, MI (US)

( * ) Notice: Subject to any disclaimer, the term of this patent is extended or adjusted under 35 U.S.C. 154(b) by 271 days.

(21) Appl. No.: 12/779,166

(22) Filed: May 13, 2010

(65) Prior Publication Data

US 2011/0282526 A1 Nov. 17, 2011

(51) Int. Cl.
*G05D 1/00* (2006.01)
*G05D 3/00* (2006.01)
*G06F 7/00* (2006.01)
*G06F 17/00* (2006.01)

(52) U.S. Cl. .............................. 701/2; 701/36
(58) Field of Classification Search ................ 701/2, 22, 701/36
See application file for complete search history.

(56) References Cited

U.S. PATENT DOCUMENTS

| | | | | |
|---|---|---|---|---|
| 7,849,944 | B2 * | 12/2010 | DeVault | 180/65.29 |
| 2005/0085956 | A1 * | 4/2005 | Losey | 701/2 |
| 2005/0085965 | A1 * | 4/2005 | Issa et al. | 701/35 |
| 2009/0114463 | A1 * | 5/2009 | DeVault | 180/65.29 |
| 2009/0250277 | A1 * | 10/2009 | Grand et al. | 180/65.265 |
| 2009/0259356 | A1 * | 10/2009 | Clark et al. | 701/22 |
| 2010/0023210 | A1 * | 1/2010 | Flick | 701/36 |
| 2010/0114404 | A1 * | 5/2010 | Donnelly | 701/2 |
| 2010/0120373 | A1 * | 5/2010 | Wheatley et al. | 455/68 |
| 2010/0138092 | A1 * | 6/2010 | Kohn | 701/22 |
| 2011/0022256 | A1 * | 1/2011 | Asada et al. | 701/22 |
| 2011/0071734 | A1 * | 3/2011 | Van Wiemeersch et al. | 701/49 |
| 2011/0202217 | A1 * | 8/2011 | Kempton | 701/22 |
| 2011/0224841 | A1 * | 9/2011 | Profitt-Brown et al. | 701/2 |

OTHER PUBLICATIONS

LexisNexis document entitled, Volkswagon E-UP! Concept—Click above for a high-res image gallery, World Premiere of the Volkswagon E-UP! Concept, Frankfurt, Sep. 15, 2009, pp. 1-5.

* cited by examiner

*Primary Examiner* — Prasad Gokhale
(74) *Attorney, Agent, or Firm* — Leydig, Voit & Mayer, Ltd.

(57) ABSTRACT

The described method and system improve electric-power driving range for electric vehicles, i.e., electric-only, hybrid electric, and other vehicles that draw electrical power from an on-board storage system for propulsion and auxiliary functions such as HVAC, defroster, defogger, seat heaters, seat coolers, etc. The described system uses an alternate energy source off-board of the vehicle, e.g., the municipal power grid, to power and run vehicle systems while the vehicle is plugged into the grid. The system also provides the user with the ability to remotely choose via an electronic medium or telematics system among multiple available alternate sources of energy to power vehicle systems. The user may remotely trigger the use of the selected source and may also remotely activate and deactivate vehicle systems powered by the alternative energy source.

18 Claims, 5 Drawing Sheets

REMOTE TRIGGER OF AN ALTERNATE ENERGY SOURCE TO POWER A VEHICLE SYSTEM

BACKGROUND OF THE INVENTION

With the erratic market cost of petroleum-based fuels, electric-only and hybrid electric vehicles have become popular as a means for providing a margin of energy security and economy. Such vehicles have other benefits including noise reduction, emission reduction, and low vibration. Despite the many advantages of electric-only and hybrid electric vehicles, there are still certain areas in which such vehicles are inferior to fuel-powered vehicles. For example, relative to fuel-powered vehicles, electric vehicles generally fall short with respect to driving range. This is generally due to the higher energy density of petroleum fuels compared to the relatively limited energy density of most viable electric energy storage systems, e.g., various types of batteries.

The demands of various auxiliary vehicle systems such as HVAC, defrosting, seat heating, and so on also contribute to the drain of electrical power from the electric storage systems of electric-only and hybrid electric vehicles. It is an object of the invention to provide such a system in various implementations. Nonetheless, it will be appreciated that the invention is not limited to systems that solve all of the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and apparatus for improving electric-power driving range for electric vehicles, including any vehicle that partially, predominantly, or exclusively uses electric energy for propulsion, wherein the electrical energy is at least partially drawn from an on-board storage system, and wherein the vehicle includes an interface to receive grid power for charging the on-board storage system. The onboard storage system may also be capable of being charged by an on-board power source such as an internal combustion engine (ICE) driving a generator. Under certain circumstances, the system described herein uses the alternate energy source off-board of the vehicle, e.g., the municipal power grid, to power and run vehicle systems.

The system also provides the user with an ability to remotely choose, via an electronic medium or telematics system, among multiple available alternate sources of energy to power vehicle systems. The user may then remotely trigger the use of the selected source similarly and may also remotely activate and deactivate vehicle systems powered by the alternative energy source. The ability to choose to power vehicle systems without running the vehicle ICE or draining the on-board vehicle battery improves the vehicle range by preventing unnecessary use of the vehicle's on-board storage when possible.

Moreover, the user is enabled to remotely monitor and personalize vehicle systems parameters through the telematics system, when the vehicle systems are powered by the alternative energy source. In an optional implementation, the user is also provided with the ability to make a time selection indicating an intended time of use of the vehicle. In response, the vehicle HVAC system and other vehicle systems such as power seats, windows, seat heating/cooling systems and the like are activated only when needed to ensure that the vehicle cabin attains the desired cabin temperature by the intended time of use.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for improving electric-power driving range for plug-in hybrid-electric and electric vehicles, thus reducing vehicle operating costs. The system uses an alternate energy source off-board the vehicle, e.g., the municipal power grid, to power and run vehicle systems on a hybrid-electric or electric vehicle.

The system also provides the user with the ability to remotely choose among multiple available sources of energy to power vehicle systems, i.e., to choose between grid power and on-board stored power. The user may then remotely trigger the use of the selected source and may also remotely activate and deactivate the electrical vehicle systems. By choosing to power vehicle systems without running the vehicle ICE or draining the on-board vehicle battery, the user is able to improve the vehicle electric-only range.

To consider a few examples, a user is enabled to remotely turn on the vehicle HVAC system and to adjust settings such as cabin temperature prior to starting on a trip. By choosing to use grid power at this time, the vehicle battery is not required, for example, to overcome the large differential between the ambient temperature and the desired cabin temperature. In addition, the functions are executed safely without turning on the vehicle's internal combustion engine, which could pose a hazard in an enclosed space.

Figure 1:
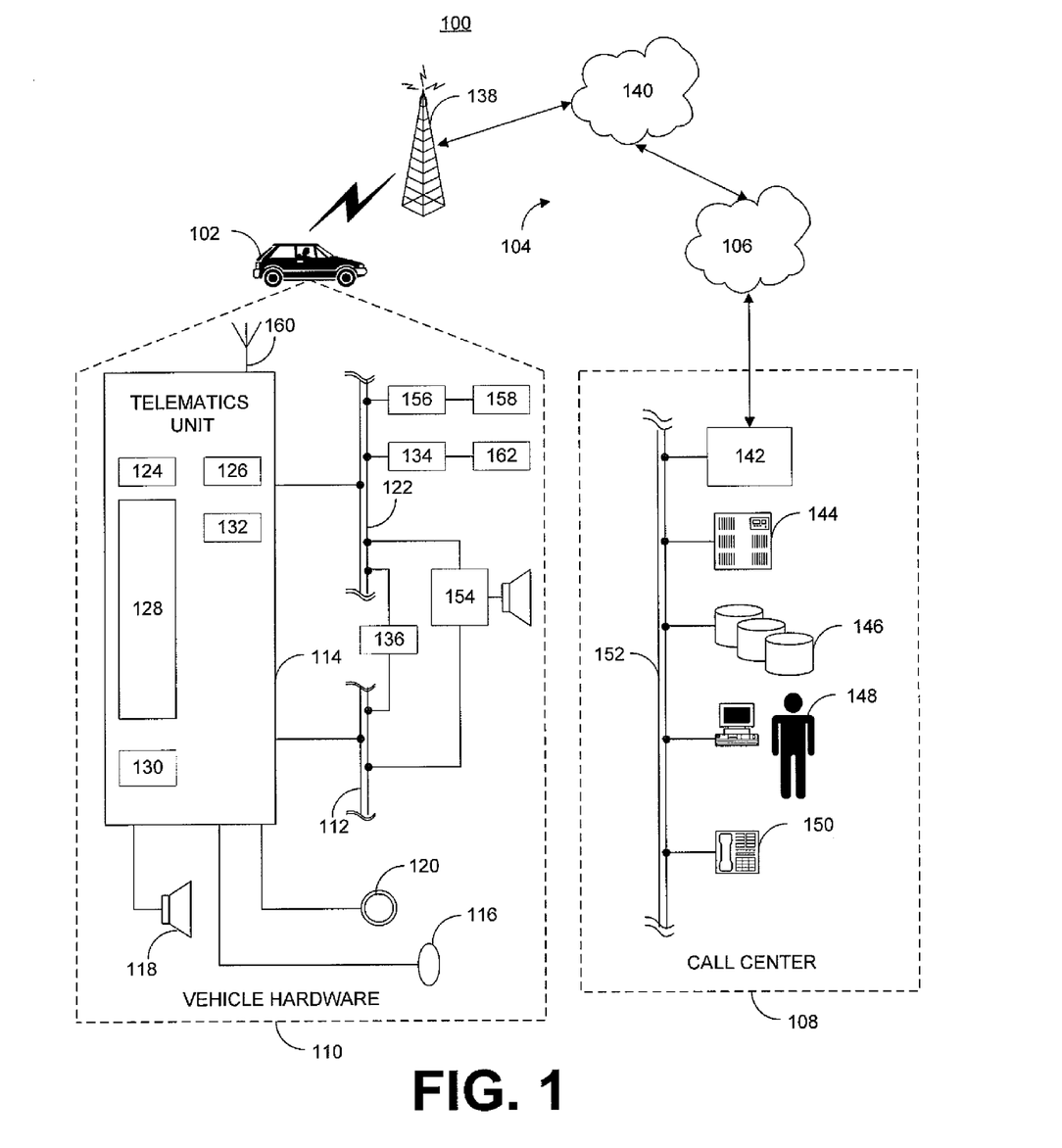
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, which may include, for example, an Ethernet connection. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
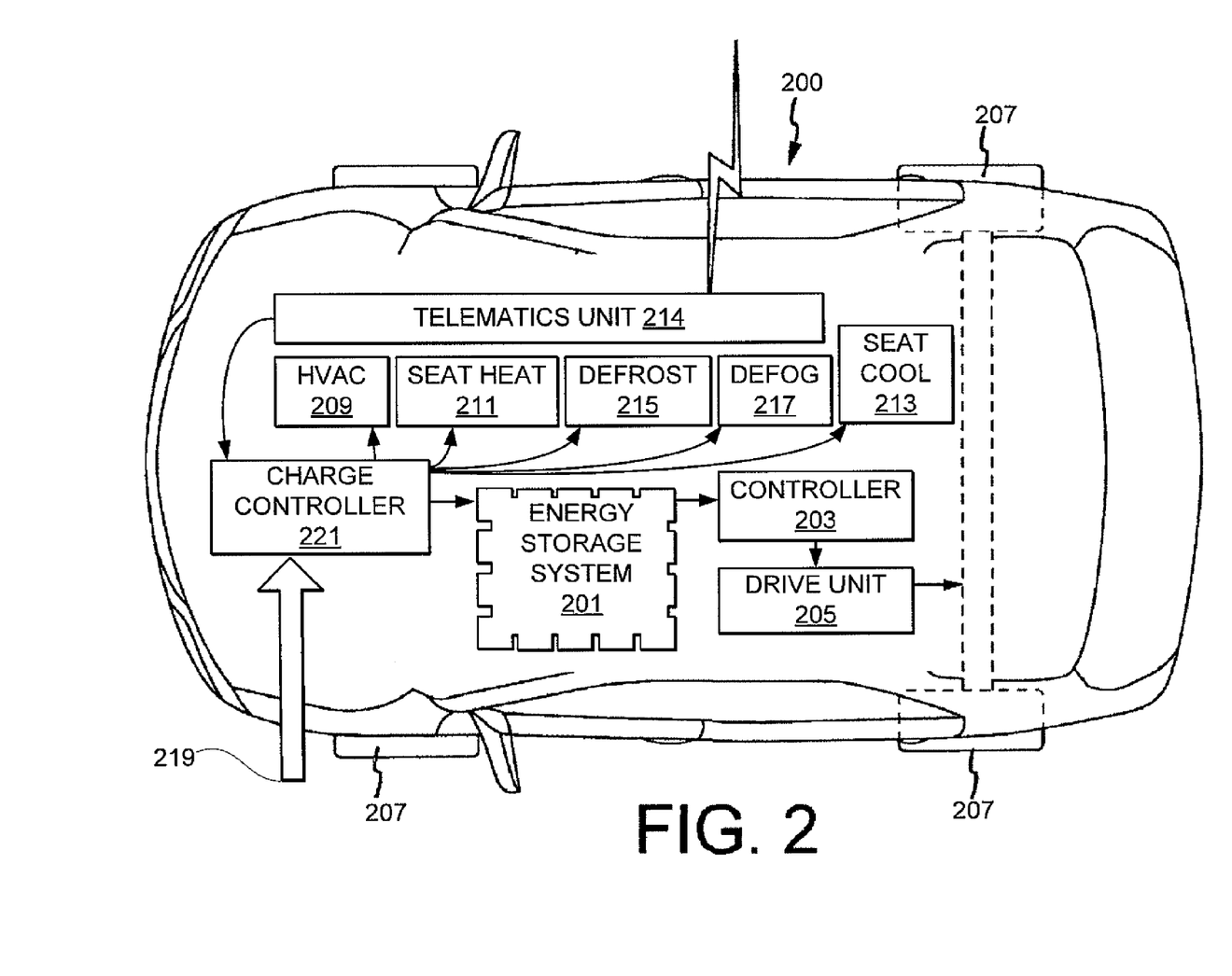
FIG. 2 is a schematic vehicle diagram showing relevant power systems and communications linkages within the vehicle and between the vehicle and a remote entity.

As noted above, the telematics unit 114 and associated components are associated in an implementation of the invention with a vehicle 102. In particular, the vehicle 102 is a plug-in hybrid-electric or electric vehicle. FIG. 2 is a vehicle schematic showing the components of the vehicle of interest with the respect to the disclosed principles and the manner in which the components may be interrelated to execute those principles. It will be appreciated, however, that the illustrated architecture is merely an example, and that the disclosed principles do not require that the vehicle be configured precisely as shown.

In the illustrated example, the vehicle 200 (102) includes an electrical energy storage system 201, e.g., a battery of suitable voltage and capacity. The electrical energy storage system 201 is conductively linkable, e.g., via a controller 203, to an electrical drive unit 205, e.g., an electrical motor or motors. The electrical energy may be modulated, voltage-modified, or otherwise modified by the controller 203 as needed to drive the electrical drive unit 205. The electrical drive unit 205 is linked or linkable to a ground engaging drive, typically including one or more wheels 207.

In order to charge the electrical energy storage system 201, a plug interface 219 is provided. The plug interface 219 is linked to the electrical energy storage system 201 via a charge controller 221. In an implementation of the described principles, the charge controller 221 is also adapted to power vehicle systems directly upon command. Available grid power will typically be sufficient to both charge the electrical energy storage system 201 if necessary and simultaneously power at least a limited number of vehicle systems. However, the charge controller 221 optionally bypasses the electrical energy storage system 201 while powering vehicle systems in an implementation.

The vehicle 102 includes a number of electrically-powered auxiliary systems, including, for example, HVAC 209, one or more seat heaters 211, one or more seat coolers 213, a defroster (e.g., forced air) 215, and a defogger (e.g., filament-based) 217. While each of these systems is electrically powered, some may require more power than others, and there is no requirement that an auxiliary system used within the invention be a high draw system. Not only do small power savings become important over time, but multiple small draws may also add simultaneously to a large draw at any given point in time.

The telematics unit 214 (114) is adapted to receive information from a remote source as discussed above and to affect the operation of the charge controller 221 or other power management system in keeping with received instructions in order to select a power source to be used for one or more auxiliary systems and optionally to activate and deactivate such systems.

Figure 3:
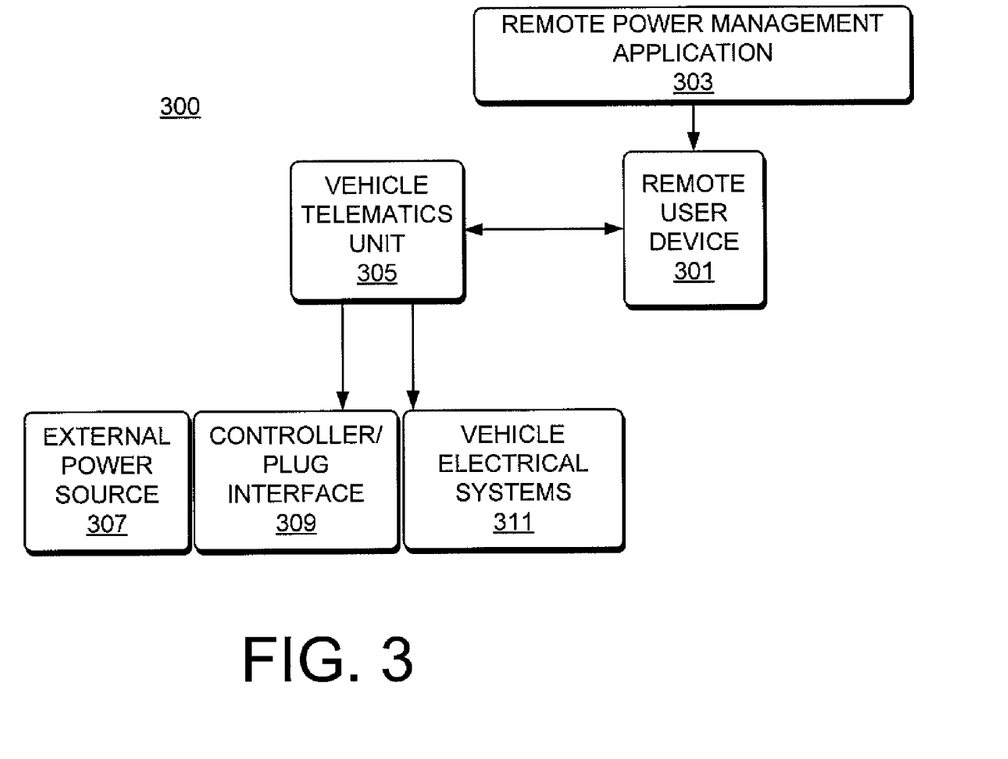
FIG. 3 is a schematic diagram showing the relationship between the remote power managing application and related system components in keeping with the described principles.

FIG. 3 is a schematic diagram showing exemplary relationships between a remote power managing application and related system components in keeping with the described principles. The illustrated system 300 includes a remote user device 301, e.g., a cell phone, smart phone, lap top computer, net book computer, tablet computer, Personal Data Assistant (PDA), desktop computer, or otherwise, wirelessly linkable to a vehicle telematics unit 305. As noted above, this linkage may be made via any wireless technology having suitable range to directly or indirectly link the two devices. Examples of suitable wireless technologies include but are not limited to 802.11 derivatives (WiFi), Bluetooth, Zigbee, and similar technologies.

The remote user device 301 interfaces with and/or runs a remote power management application 303. The remote power management application 303 is local to the remote device in one implementation. However, in an alternative implementation, the remote power management application 303 is run on a server or other computing device remote from the remote user device, with only the user interface support being run locally.

In order to select the energy source for auxiliary vehicle systems, the vehicle telematics unit 305 is linked to a controller/plug interface 309, which is in turn linked to both the vehicle electrical systems 311 and an external power source 307. The vehicle telematics unit 305 is linked to the vehicle electrical systems 311 in an implementation for the purpose of controlling such systems, e.g., to set, activate, and/or deactivate them, in response to a remote command.

Figure 4:
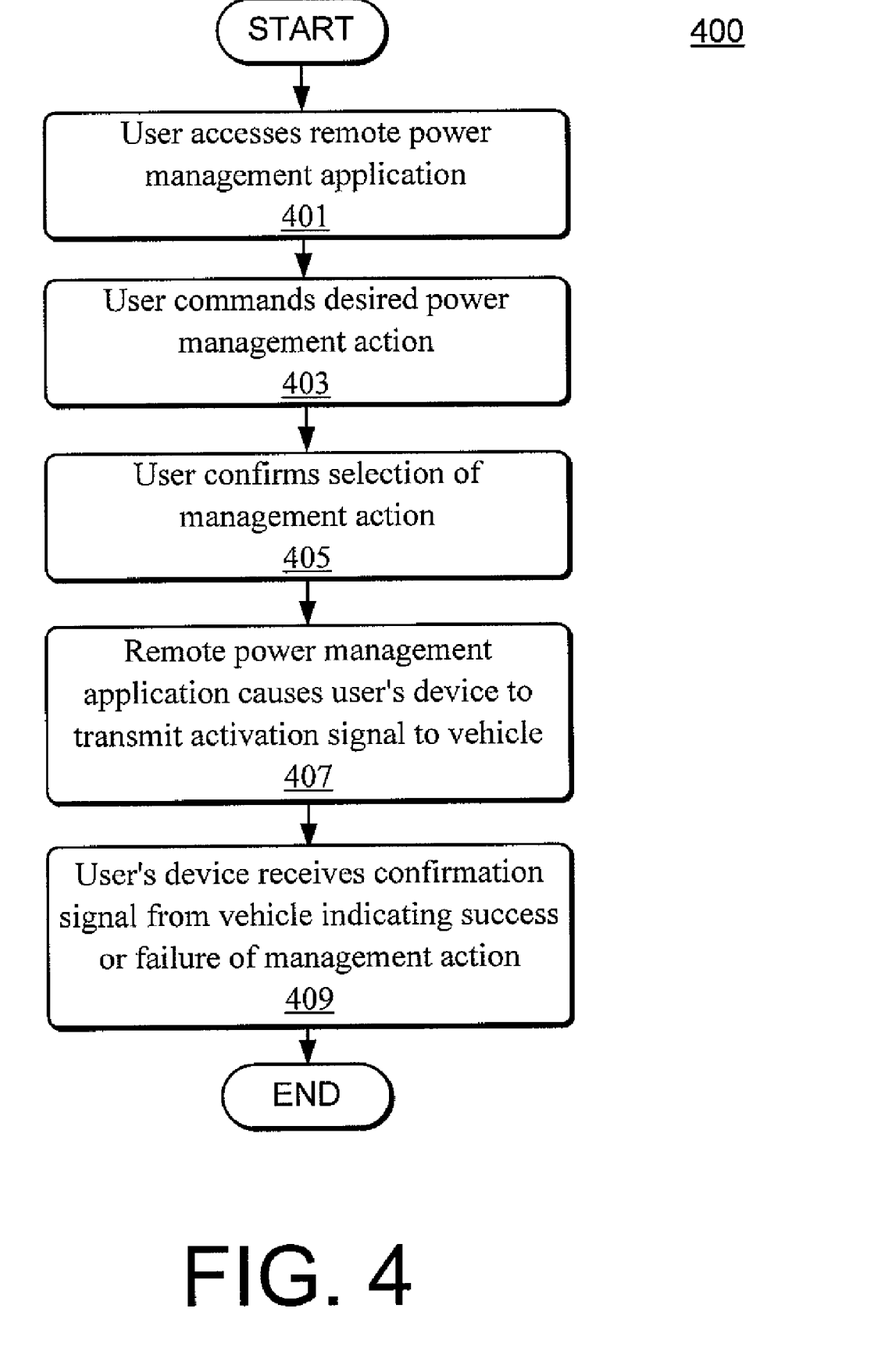
FIG. 4 is a flow chart illustrating a process of user control relating to programming of a vehicle preparation system according to aspects of the described principles.

FIG. 4 illustrates a flow chart showing a process 400 for user control relating to programming of a vehicle preparation system according to aspects of the described principles. At stage 401, a user of the vehicle, e.g., vehicle 200, accesses a remote power management application, residing on a personal computer, laptop, personal data device or cellular device remote from the vehicle 200. Via the application at stage 403, the user commands a desired power management action. The desired action may be specified by the user via a pull-down menu or other input mechanism, and may include activating an electrically-powered vehicle auxiliary system such as those mentioned above or others, and/or specifying a power source for running an electrically-powered vehicle auxiliary system.

At stage 405, the user finalizes their choice, e.g., by selecting a "Done" or "Send" option or icon, and at stage 407, the remote power management application causes the user's device to transmit an activation signal to the vehicle's telematics facilities via one or more networks. Upon receipt of the activation signal, the vehicle's telematics facilities will process the received signal in one of a number of ways depending upon certain conditions. This will be more fully described with reference to FIG. 5. In any case, the user device optionally receives a confirmation message at stage 409, the message indicating that the selected management action has been executed or alternatively indicating that the action was not taken and optionally giving the reason that the action could not be taken.

Figure 5:
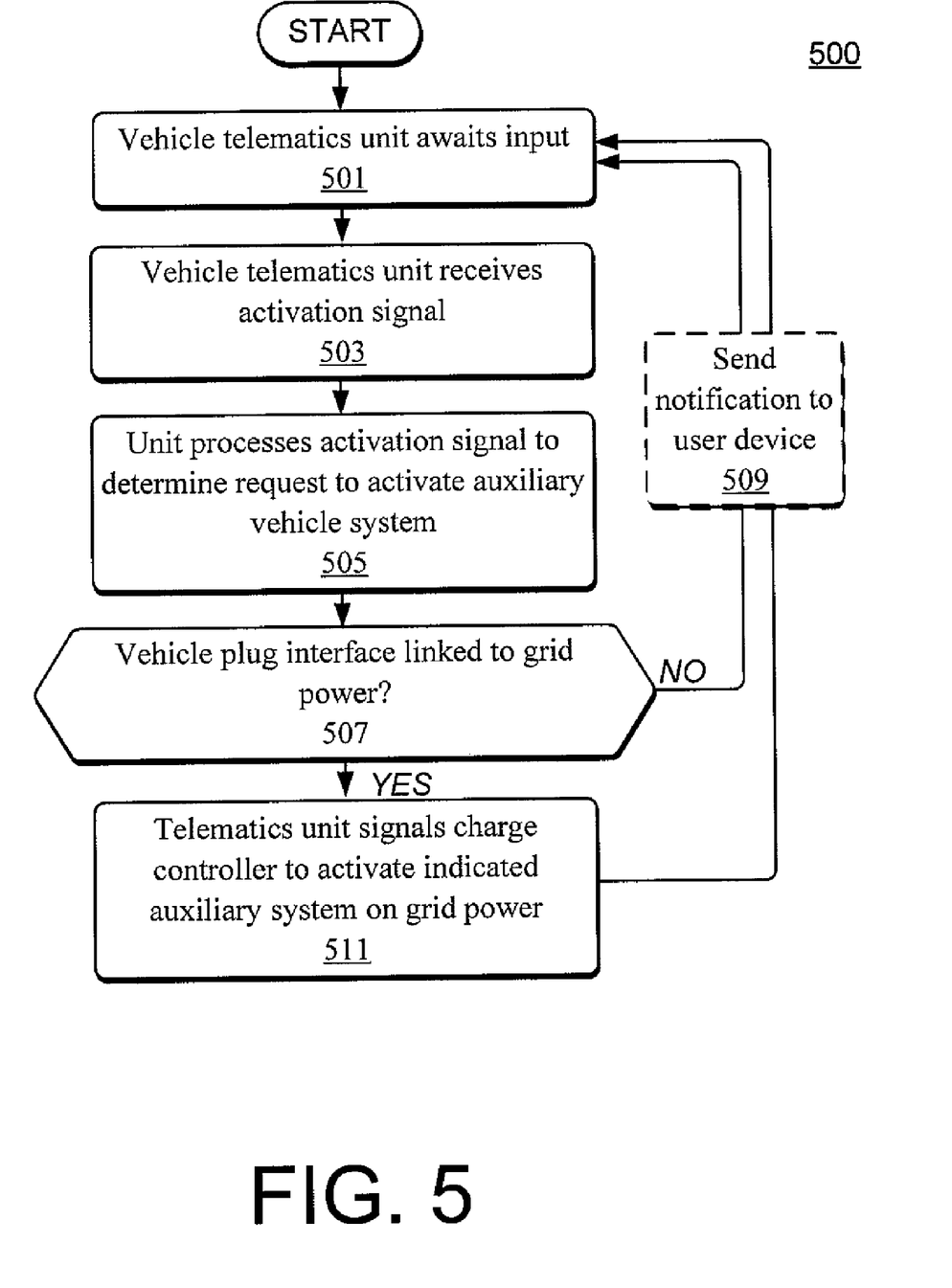
FIG. 5 is a flow chart illustrating a process of vehicle system activation according to aspects of the described principles.

FIG. 5 is a flow chart illustrating a process of vehicle activation response according to aspects of the described principles. While the processes described by way of FIG. 5 are described as controlled or executed by the telematics unit 214, it will be appreciated that the telematics unit may instead pass the activation signal to another vehicle unit or module for further processing. For example, in an implementation, it is the charge controller 221 rather than the telematics unit 214 that executes the automated steps of the process.

At stage 501 of the process 500, the vehicle's telematics facilities, e.g., telematics unit 214 (114), await input. The telematics unit 214 receives an activation signal via a wireless network, e.g., a cellular or other wireless network, at stage 503. The activation signal originates from a remote user device as described by way of FIG. 4. Upon receipt of the activation signal, the telematics unit 214 processes the activation signal at stage 505 to determine that the signal comprises a request to activate one or more electrically-powered auxiliary vehicle systems, e.g., HVAC 209, seat heaters 211, seat coolers 213, defroster 215, and/or defogger 217. At stage 507, the telematics unit 214 determines, via the charge controller 221, whether the plug interface 219 is linked to grid power, i.e., receiving electrical power from outside of the vehicle 200. For example, the vehicle may be physically plugged into grid power via a residential or commercial plug input, or may be situated adjacent an inductive charge station, or may be otherwise linked to and receiving electrical power from the municipal grid.

If it is determined at stage 507 that the plug interface 219 is not linked to grid power, then the process 500 returns to stage 501 to await further input. In an implementation, the telematics unit 214 sends a notification to the user at stage 509 that the vehicle is not plugged in and the activation signal has been disregarded.

However, if it is determined at stage 507 that the plug interface 219 is linked to grid power, then the process 500 continues to stage 511, whereupon the telematics unit 214 signals the charge controller or other responsible component to activate the indicated auxiliary system on grid power, i.e., without using power from the vehicle's electrical energy storage system 201. Depending upon the capability of the external power source connected to the vehicle and upon the needs of the electrical energy storage system 201, the charge controller 221 may continue to charge, or to maintain the charge in, the electrical energy storage system 201 during operation of the indicated auxiliary system.

Although the foregoing system and process have been described with reference to municipal power sources, it will be appreciated that other sources of external electrical power may instead be used. For example, the described principles are also usable with respect to stand-alone generator systems such as may be used at industrial sites, event sites, etc. In addition, certain large vehicles may generate enough electrical power to allow charging of the energy storage system of another vehicle and operate auxiliary systems in that vehicle. For example, large recreational vehicles and industrial transport vehicles may have this capability, so that, for example, an electric or hybrid vehicle being towed or carried by such a larger vehicle may be maintained in a charged state.

It will be appreciated that the described principles provide a new and useful system and method for maintaining an electrical charge in the onboard energy storage facilities of an electric or hybrid vehicle while at the same time allowing the user to remotely cause the vehicle to be prepared by activating auxiliary vehicle systems. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for remotely managing power use of auxiliary electrical systems in an electric vehicle, the system comprising:
   an on-board electrical energy storage device within the electric vehicle;
   an electrical interface between the on-board electrical energy storage device and an off-board electrical energy source external to the vehicle;
   a controller for selecting between the on-board electrical energy storage device and the off-board electrical energy source as a power source for one or more of the auxiliary electrical systems wherein the auxiliary electrical systems include at least one of an HVAC system, a seat heater, a seat cooler, a defroster, and a defogger; and
   a telematics device linked to the controller for causing the controller to select a specific one of the on-board electrical energy storage device and the off-board electrical energy source to power a selected one of the auxiliary electrical systems based on a command signal received wirelessly from a remote user device, wherein the telematics device is configured to determine whether the electrical interface is linked to the off-board electrical energy source and to send a notification to the remote user device if the telematics device determines that the electrical interface is not linked to the off-board electrical energy source.

2. The system for remotely managing power use of auxiliary electrical systems in an electric vehicle according to claim 1, wherein the off-board electrical energy source external to the vehicle comprises a municipal power grid.

3. The system for remotely managing power use of auxiliary electrical systems in an electric vehicle according to claim 1, wherein the controller is further adapted to activate and deactivate at least one of the auxiliary electrical systems.

4. The system for remotely managing power use of auxiliary electrical systems in an electric vehicle according to claim 3, wherein the controller is further adapted to set an operational parameter of the at least one auxiliary electrical system.

5. The system for remotely managing power use of auxiliary electrical systems in an electric vehicle according to claim 1, wherein the telematics device is configured to transmit a confirmation signal to remote user device indicating an execution status of the command signal received wirelessly from a remote user device.

6. The system for remotely managing power use of auxiliary electrical systems in an electric vehicle according to claim 1, wherein the remote user device is one of a cellular telephone, a laptop computer, a desktop computer, a smart phone, a net book computer, a tablet computer, and a Personal Data Assistant (PDA).

7. The system for remotely managing power use of auxiliary electrical systems in an electric vehicle according to claim 1, wherein the auxiliary electrical systems include at least an HVAC system, and wherein the controller is adapted to activate and adjust the HVAC system to reach a vehicle cabin temperature specified in the command signal received wirelessly from the remote user device.

8. The system for remotely managing power use of auxiliary electrical systems in an electric vehicle according to claim 1, wherein the electric vehicle includes both an electric motor and an internal combustion engine.

9. An apparatus for assisting an electric vehicle user in remotely executing power management activities with respect to auxiliary electrical systems in an electric vehicle, the apparatus comprising:
a portable communication device remote from the electric vehicle and associated with the electric vehicle user; and
an application executed on the portable communication device to control the energy use of one or more of the auxiliary electrical systems, wherein the auxiliary electrical systems include at least one of an HVAC system, a seat heater, a seat cooler, a defroster, and a defogger, the application including computer-executable instructions read from a computer-readable medium to execute steps including:
receiving user input from the electric vehicle user identifying at least one of the auxiliary electrical systems and identifying a power source to be used to power the at least one identified auxiliary electrical system, wherein the power source is an off-board electrical energy source;
transforming the received input into a command signal for wireless transmission to a telematics unit within the electric vehicle; and
receiving a notification from the telematics unit that the electric vehicle is not plugged in if the telematics unit determines that the electrical interface is not linked to an off-board electrical energy source.

10. The apparatus for assisting an electric vehicle user in remotely executing power management activities according to claim 9, wherein the identified power source comprises a municipal power grid.

11. The apparatus for assisting an electric vehicle user in remotely executing power management activities according to claim 9, wherein the received user input further includes a request to set an operational parameter of the at least one auxiliary electrical system, and wherein the command signal further includes instructions to set the operational parameter of the at least one auxiliary electrical system.

12. The apparatus for assisting an electric vehicle user in remotely executing power management activities according to claim 9, wherein the instructions further include instructions to process a confirmation signal received from the telematics unit to indicate to the user an execution status of the command signal.

13. The apparatus for assisting an electric vehicle user in remotely executing power management activities according to claim 9, wherein the portable communication device remote from the electric vehicle is one of a cellular telephone, a laptop computer, a desktop computer, a smart phone, a net book computer, a tablet computer, and a Personal Data Assistant (PDA).

14. The apparatus for assisting an electric vehicle user in remotely executing power management activities according to claim 9, wherein the auxiliary electrical systems include at least an HVAC system, and wherein the command signal is adapted to activate the HVAC system to provide a vehicle cabin temperature specified in the command signal.

15. The apparatus for assisting an electric vehicle user in remotely executing power management activities according to claim 9, wherein the electric vehicle includes both an electric motor and an internal combustion engine.

16. A method of preparing an electric vehicle for use by a user, the method comprising:
receiving, at a telematics unit, a user selection of a desired cabin temperature for the vehicle from a remote user device, wherein the user selection also specifies that a power source external to the vehicle is to be used;
determining, by the telematics unit, that an electrical interface of the vehicle is not linked to the external power source; and
sending, by the telematics unit, a notification to the remote user device indicating that the vehicle is not linked to the external power source.

17. The method of preparing an electric vehicle for use by a user according to claim 16, wherein receiving a user selection of a desired cabin temperature for the vehicle further comprises receiving a time selection indicating an intended time of use of the vehicle.

18. The method of preparing an electric vehicle for use by a user according to claim 16, wherein the power source external to the vehicle comprises a municipal power grid.

\* \* \* \* \*